(12) United States Patent
Chaurasiya et al.

(10) Patent No.: US 11,099,958 B2
(45) Date of Patent: Aug. 24, 2021

(54) INSTRUCTION GENERATION FOR VALIDATION OF PROCESSOR FUNCTIONALITY

(71) Applicant: Hewlett Packard Enterprise Development LP, Houston, TX (US)

(72) Inventors: Ramesh Chandra Chaurasiya, Bangalore Karnataka (IN); Somasundaram Arunachalam, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 161 days.

(21) Appl. No.: 16/358,638

(22) Filed: Mar. 19, 2019

(65) Prior Publication Data

US 2020/0301795 A1   Sep. 24, 2020

(51) Int. Cl.
  *G06F 11/22* (2006.01)
  *G06F 9/30* (2018.01)
  *G06F 11/14* (2006.01)
(52) U.S. Cl.
  CPC ...... *G06F 11/2236* (2013.01); *G06F 9/30141* (2013.01); *G06F 11/1448* (2013.01)
(58) Field of Classification Search
  CPC ............. G06F 11/2236; G06F 11/1448; G06F 9/30141
  See application file for complete search history.

(56) References Cited

U.S. PATENT DOCUMENTS 9,836,354 B1 * 12/2017 Potlapally ........... G06F 11/1438
10,776,249 B2 * 9/2020 Duale ................. G06F 9/30101

FOREIGN PATENT DOCUMENTS

CN   101063979   10/2007

OTHER PUBLICATIONS

Herdt, V. et al.; "Verifying Instruction Set Simulators using Coverage-guided Fuzzing"; Mar. 25-29, 2019; 6 pages.
Kim, D. et al.; "Dessert: Debugging RTL Effectively with State Snapshotting for Error Replays Across Trillions of Cycles"; Aug. 27-31, 2018; 5 pages.
Liu, M.; "Sounding Error Detection Latency with Entranced Execution Fingerprinting"; Dec. 16, 2015; 85 pages.
Sahin, O. et al.; "PROTEUS: Detecting Android Emulators from Instruction-level Profiles"; Jul. 2018; 20 pages.

* cited by examiner

*Primary Examiner* — Nadeem Iqbal
(74) *Attorney, Agent, or Firm* — Hewlett Packard Enterprise Patent Department

(57) ABSTRACT

Examples of instruction generation for validation of processor functionality are described. In an example, a validation instruction to be inserted in an instruction stream is selected. The validation instruction being generated based on an instruction set architecture of a processor-under-test (PUT). It is identified whether a hardware register of the PUT, is available for storing an outcome of execution of the validation instruction by the PUT. The validation instruction is inserted in the instruction stream, in response to identifying that the hardware register is available for storing the outcome. A set of data backup instructions is inserted in the instruction stream, in response to identifying that the hardware register is unavailable for storing the outcome. The set of data backup instructions is to store respective register values of each of the plurality of hardware registers in a primary memory.

20 Claims, 7 Drawing Sheets

SYSTEM 100

PROCESSOR(S) 102

MEMORY 104

[[GENERATE A PLURALITY OF VALIDATION INSTRUCTIONS BASED ON AN INSTRUCTION SET ARCHITECTURE OF A PROCESSOR-UNDER-TEST (PUT);

SELECT A VALIDATION INSTRUCTION, AMONGST THE PLURALITY OF VALIDATION INSTRUCTIONS, TO BE INSERTED IN AN INSTRUCTION STREAM TO BE EXECUTED BY THE PUT;

DETERMINE WHETHER AN OUTCOME OF EXECUTION OF THE VALIDATION INSTRUCTION BY THE PUT IS TO UPDATE A REGISTER VALUE OF A HARDWARE REGISTER, AMONGST A PLURALITY OF HARDWARE REGISTERS OF THE PUT;

IDENTIFY WHETHER THE HARDWARE REGISTER IS AVAILABLE FOR STORING THE OUTCOME;

INSERT THE VALIDATION INSTRUCTION IN THE INSTRUCTION STREAM, IN RESPONSE TO IDENTIFYING THAT THE HARDWARE REGISTER IS AVAILABLE FOR STORING THE OUTCOME; AND

INSERT A SET OF DATA BACKUP INSTRUCTIONS IN THE INSTRUCTION STREAM, IN RESPONSE TO IDENTIFYING THAT THE HARDWARE REGISTER IS UNAVAILABLE FOR STORING THE OUTCOME, WHEREIN THE SET OF DATA BACKUP INSTRUCTIONS IS TO STORE RESPECTIVE REGISTER VALUES OF EACH OF THE PLURALITY OF HARDWARE REGISTERS IN A PRIMARY MEMORY]]

Fig. 1

INSTRUCTION GENERATION FOR VALIDATION OF PROCESSOR FUNCTIONALITY

BACKGROUND

A processor of an electronic device, such as a computer, has an instruction set architecture (ISA) which serves as an interface between software and hardware of the electronic device. The ISA generally defines the supported data types, state of the main memory and registers, semantics associated with the main memory and the registers, such as memory consistency and addressing modes, an instruction set which represents a set of machine readable instructions that comprises a machine language of the electronic device, and an input/output model. Functionality of the processor, also referred to as processor functionality, may be validated by verifying functionality of the instruction set of the processor to check if instructions in the instruction set perform their intended tasks or computations.

For verifying functionality of the instruction set, generally a random instruction test (RIT) is employed. The RIT may also be used to verify the ISA of a virtual processor, such as in an emulated platform solution. In the RIT, a random instruction stream is generated and executed by a processor for which functional validation is carried out (also known as a processor-under-test (PUT)). The random instruction stream includes a sequence of multiple instructions generated in real-time. The instructions in the random instruction stream are generated based on the ISA of the PUT. In RIT, the random instruction stream may be programmatically generated and executed by the PUT with different values of operands.

BRIEF DESCRIPTION OF DRAWINGS

The following detailed description references the drawings, wherein:

FIG. 1 illustrates a system for generation of an instruction stream for validating processor functionality, according to an example;

DETAILED DESCRIPTION

Figure 2:
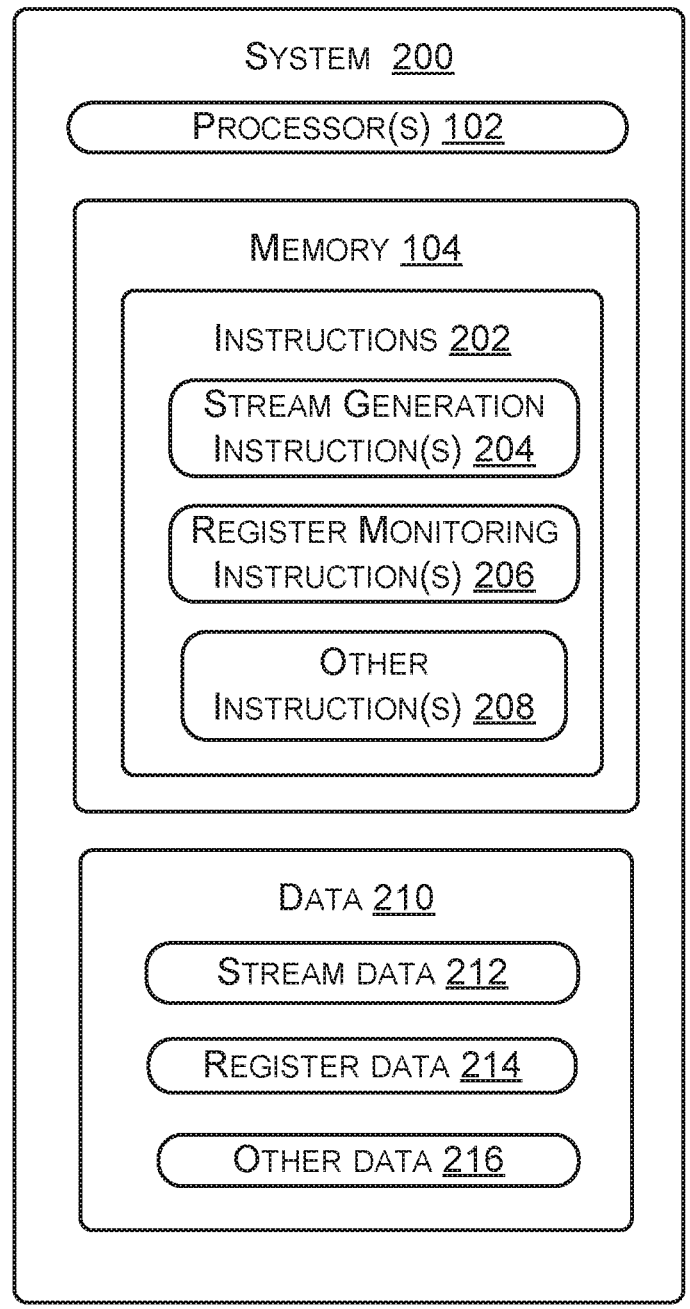
FIG. 2 illustrates a system for generation of an instruction stream for validating processor functionality, according to another example.

Random instruction test (RIT) is generally executed on two different systems/processors, either simultaneously or sequentially, thereby obtaining corresponding output(s) after execution of the random instruction stream by the two processors. The corresponding output(s) are finally compared considering one of the two processors as a reference. Among the two processors, one processor is referred to as a processor-under-test (PUT) for which functionality validation is being carried out and the other processor is referred to as a reference processor.

During the RIT, hardware registers of the PUT and the reference processor are loaded with a predefined value. A hardware register includes a circuit composed of flip flop(s) having capabilities to read or write multiple data bits at a time and can be referenced using an address associated with a register in a manner similar to a memory address. A hardware register may also have hardware-related functions and is also accessible to the processor. After the hardware registers are loaded with the predefined value, the random instruction stream is generated. The random instruction stream is fed to both the PUT and the reference processor with identical operands. An outcome after execution of an instruction, from the random instruction stream, is stored in the hardware register. The outcome after execution of the instruction refers to an output value that is stored in the hardware register. The hardware register storing the outcome is temporarily exhausted and is marked as a target register.

As the execution of the random instruction stream continues, each of the hardware registers stores an outcome of execution of a respective instruction from the random instruction stream. Thus, as the RIT progresses, the hardware registers are used up. Once a hardware register is used as a target register, it can be used as a target register again, after the earlier outcome stored by that register is used as an input to a subsequent instruction in the random instruction stream. As the earlier outcome is fed to the subsequent instruction, the target register becomes available for storing an outcome of execution of the subsequent instruction.

This is continued until the execution of the random instruction stream is complete. Finally, after completion of execution of the random instruction stream by the PUT and the reference processor, a final outcome of execution of the random instruction stream is stored in respective hardware registers of the PUT and the reference processor. The final outcome refers to values stored in the respective hardware registers of the PUT and the reference processor after completion of the RIT. The final outcomes from the PUT and the reference processor are compared to detect a mismatch. The mismatch indicates discrepancy in execution of an instruction, amongst multiple instructions of the random instruction stream, which may result in an erroneous outcome to be stored in a hardware register. On detecting the mismatch, it may be concluded that execution, by the PUT, of an instruction, among the multiple instructions in the random instruction stream, results in a bug in the PUT. A bug refers to a flaw, failure or fault in a computer program or system that causes it to produce an incorrect or unexpected result, or to behave in an unintended manner. In an example, the bug may result due to instruction dependencies that may cause delayed updates to the hardware registers of the PUT.

To identify the instruction execution of which results in the bug, the random instruction stream is analysed. The last instruction, in the random instruction stream, which updated the hardware register where the mismatch occurred is checked to verify if execution of the last instruction resulted in the bug. On identifying that execution of the last instruction did not result in the bug, the preceding instruction whose outcome was used as an input to the last instruction is checked for the bug. Analysing the instructions one by one for the bug, starting from the last instruction, may be referred to as back tracking. Through back tracking, multiple instructions of the random instruction stream may be analysed before the instruction, execution of which resulted in the bug, is identified. In the above-described technique, identifying the instruction resulting in the bug involves manual effort and there may be chances that the bug remains undetected. Also, if multiple instructions in the instruction stream results in bugs, the detection of those instructions may be complex, time consuming, and the bugs may remain undetected.

Consider some example scenarios in which detection of the instruction resulting in the bug is complex or the bug may remain undetected. In an example, if two instructions in the random instruction stream are executed in a faulty manner, such that the final outcome is correct, then the bugs resulting from execution of the two instructions may remain undetected even after running the RIT multiple times. In another example, an outcome resulting from execution of an instruction, in the random instruction stream, may have a first portion of data bits representing a correct value and a second portion of data bits representing an incorrect value resulting from a bug. If a succeeding instruction, in the random instruction stream, is configured such that it uses the first portion of the data bits of the outcome as an input and masks/rejects the second portion, then the incorrect value may not get propagated to the final outcome and consequently the bug may remain undetected. Further, in another example, an instruction, from the random instruction stream, may involve an arithmetic operation with contents of a hardware register having "zero" value stored therein. Depending on a nature of the instruction, an error resulting from a bug in such an instruction may not be propagated to the final outcome and thus the bug may remain undetected. Thus, identification of an instruction resulting in a bug using RIT involves manual effort, is complex and time consuming, and may result in bugs remaining undetected.

The present disclosure relates to generation of an instruction stream for validating processor functionality which facilitates detection of bugs resulting from execution of instructions by a processor with reduced manual effort, enhanced accuracy, reduced complexity, and reduced time consumption. According to the present disclosure, a validation instruction to be inserted in the instruction stream is selected from a plurality of validation instructions generated based on an instruction set architecture of a processor-under-test (PUT). The validation instructions refer to machine readable instructions having an opcode and an operand which are supported by an instruction set of the PUT. Validation instructions may be generated with variation in operand and change in instruction dependency to obtain a variety of test scenarios for validation of processor functionality. It is then identified whether a hardware register, amongst a plurality of hardware registers of the PUT, is available for storing an outcome of execution of the validation instruction by the PUT. The outcome after execution of the validation instruction refers to an output value or result obtained after the validation instruction is executed by the PUT. In response to identifying that the hardware register is available for storing the outcome, the validation instruction is inserted in the instruction stream. In response to identifying that the hardware register is unavailable for storing the outcome, a set of data backup instructions is inserted in the instruction stream. The set of data backup instructions causes the processor to capture the current machine state of the processor by storing respective register values of each of the plurality of hardware registers in a primary memory. The primary memory is a memory of an electronic device, such as a computer, that is accessible directly by the processor. In an example, the primary memory includes a cache memory, a random access memory (RAM) and a Read Only Memory (ROM).

Since, upon execution of the data back-up instructions by the PUT, the respective register values of the plurality of hardware registers are stored in the primary memory, the respective outcome(s) after execution of each of the validation instructions in the instruction stream get stored in the primary memory. After execution of the instruction stream is complete, each outcome from the primary memory of the PUT may be compared with a corresponding outcome of the reference processor to detect a bug. If there is a mismatch in corresponding outcomes from the PUT and the reference processor, it may be detected that execution of the instruction, which produced the outcome, results in a bug. Since each outcome resulting from execution of each validation instruction, in the instruction stream, is stored in the primary memory and compared, the chances of a bug remaining undetected may be reduced/eliminated. Thus, the present disclosure facilitates in identifying the bug in processor functionality accurately with reduced manual effort. Accurate identification of bugs may enable efficient and faster processor/emulator debugging consequently facilitating processor functionality testing and efficient processor design.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1 illustrates a system 100 for generation of an instruction stream for validating processor functionality, according to an example. The system 100 may be a computing system having data processing, storage, and networking capabilities. Examples of the system 100 include personal computers, laptops, enterprise servers, embedded systems, or the like.

The system 100 includes a processor 102 and a memory 104 coupled to the processor 102. The memory 104 stores instructions executable by the processor 102. The instructions when executed by the processor 102 may cause the processor 102 to generate a plurality of validation instructions based on an instruction set architecture of a processor-under-test (PUT). The PUT refers to a processor of an electronic device, such as a computer, for which functional validation is carried out. The instruction set architecture (ISA) serves as an interface between software and hardware of the electronic device and defines the supported data types, state of the main memory and registers, semantics associated with the main memory and the registers, an instruction set which represents a set of machine readable instructions that comprises a machine language of the electronic device, and an input/output model. In an example, the instruction set architecture may belong to the "x86" family of instruction set architectures. The instruction set associated with the PUT may be verified for validating processor functionality of the PUT. The validation instructions may be instruction(s) from the instruction set of the PUT. In an example, the validation instruction may include an opcode and an operand.

The instructions when executed by the processor 102 may cause the processor 102 to select a validation instruction, amongst the plurality of validation instructions, to be inserted in an instruction stream to be executed by the PUT. The validation instruction may be selected based on a user input specifying a type of operation of the PUT which is to be validated. For example, the user input may specify that a predefined arithmetic operation of the PUT which is to be validated. The validation instruction selected, based on the user input, may include the predefined arithmetic operation and its variations and application on different operands.

Further, the instructions when executed by the processor 102 may cause the processor 102 to determine whether an outcome of execution of the validation instruction by the PUT is to update a register value of a hardware register, amongst a plurality of hardware registers of the PUT. Hardware registers of the PUT refer to hardware registers accessible by the PUT for read and/or write operations. The outcome of execution of the validation instruction is an output obtained after the validation instruction is executed by the PUT. The outcome may be stored in a single bit or in multiple bits.

The instructions when executed by the processor 102, further cause the processor 102 to identify whether the hardware register is available for storing the outcome. In response to identifying that the hardware register is available for storing the outcome, the instructions cause the processor 102 to insert the validation instruction in the instruction stream. In response to identifying that the hardware register is unavailable for storing the outcome, the instructions cause the processor 102 to insert a set of data backup instructions in the instruction stream, where the set of data backup instructions is to store respective register values of each of the plurality of hardware registers in a primary memory. The primary memory is a memory of an electronic device, such as a computer, that is accessible directly by the processor, such as the PUT. In an example, the primary memory includes a cache memory, a random-access memory (RAM) and a Read Only Memory (ROM). Thus, the respective register values of each of the plurality of hardware registers are stored in the primary memory and may be prevented from being over written, thereby enabling the system 100 to capture outcome(s) of execution of each validation instruction.

Example of a set of data backup instructions is provided below.

---

"adds [loc5] = 0, r32
;;
nop.m 0
nop.i 0
;;
st8 [loc5] = r0, 8
;;
st8 [loc5] = r1, 8
nop.i 0
;;
......"

---

The set of data backup instructions, exemplified above, may be implemented to copy respective register values of the hardware registers, from the hardware registers to the primary memory. The set of data backup instructions, exemplified above, may be implemented in a processor having an "Itanium" based ISA, such as "IA-64".

Consider that after execution of the validation instruction(s), the outcomes(s) are stored in the hardware registers r0, r1, . . . , r10 and all the hardware registers r0 to r10 are temporarily exhausted. Thus, the set of data backup instructions may be inserted in the instructions stream, execution of which causes the processor to store the outcome(s) from the hardware registers r0 to r10 into the primary memory. In the example set of data backup instructions, consider that r32 is a hardware register which contains a starting memory address of a memory buffer (primary memory) where outcomes(s) of execution of the validation instruction(s) are to be sequentially stored.

The instruction "adds [loc5]=0, r32" when executed by the processor, causes the processor to copy the memory address contained in the hardware register r32 in a temporary variable, "loc5". The notation "[loc5]" refers to the memory address pointed by the variable "loc5". Thus, "[loc5]" functions similar to a memory pointer.

The instruction "st8 [loc5]=r0, 8", when executed by the processor, causes the processor to store 8 bytes of outcome from the hardware register "r0" into the memory address pointed by "[loc5]" and updates the pointer "[loc5]" by 8 bytes, such that "[loc5]" now points to the next sequential memory address in the memory buffer where an outcome from a subsequent hardware register, such as r1 may be stored. The instruction "st8 [loc5]=r1, 8", when executed by the processor, causes the processor to store 8 bytes of outcome from the hardware register r1 into the memory address pointed by the updated value of "[loc5]". "[loc5]" is further updated by 8 bytes, such that "[loc5]" points to the next sequential memory address in the memory buffer where an outcome from a subsequent hardware register, such as r2, may be stored. Thus, the outcome(s) stored in each of the hardware registers r0 to r10 may be stored in the primary memory before the subsequent validation instructions are inserted in the instruction stream.

After execution of the instruction stream is complete, each outcome from the primary memory of the PUT may be compared with a corresponding outcome of the reference processor to detect a bug. If there is a mismatch in corresponding outcomes from the PUT and the reference processor, it may be detected that the instruction, execution of which produced the outcome, resulted in a bug in processor functionality of the PUT. Thus, the present disclosure facilitates in identifying the bug accurately with reduced manual effort. Also, since each outcome resulting from execution of each instruction, in the instruction stream, is stored and compared, therefore, the chances of a bug left undetected may be reduced/eliminated.

FIG. 2 illustrates a system 200 for generation of an instruction stream for validating processor functionality, according to an example. In an example, the system 200 may be an enterprise server in a datacenter, a network controller, and an embedded device.

The system 200 includes the processor 102 and the memory 104 coupled to the processor 102. The memory 104 stores instructions executable by the processor 102. The processor 102 may be implemented as microprocessors, microcomputers, microcontrollers, digital signal processors, central processing units, state machines, logic circuitries, and any devices that manipulate signals based on operational instructions. Among other capabilities, the processor 102 is configured to fetch and execute computer-readable instructions stored in the memory 104. The computer-readable instructions, also referred to as instructions, includes instruction(s) 202. The instructions(s) 202 may include routines, programs, components, applications, data structures, and the like, which perform particular tasks or implement particular abstract data types. The instructions, being executable by the processor(s), may also be referred to as processor-executable instructions. The execution of the instructions to perform a function may be interchangeably referred to as the instructions causing performance of the function or the instructions enabling performance of the function.

The functions of the various elements shown in the FIG. 2, including any functional blocks labeled as "processor(s)", may be provided through the use of dedicated hardware as well as hardware capable of executing software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA). Other custom-built hardware, may also be included.

The memory 104 may include any computer-readable medium known in the art including, for example, volatile memory (e.g., RAM), and/or non-volatile memory (e.g., EPROM, flash memory, etc.). The instruction(s) 202 include stream generation instruction(s) 204 which corresponds to instructions stored on a computer-readable medium and executable by a processor to select, process, and create validation instruction(s) and to insert the validation instruction(s) in an instruction stream for functionality validation of a PUT and register monitoring instruction(s) 206 which corresponds to instructions stored on a computer-readable medium and executable by a processor to monitor states and storage capacity of hardware registers accessible by the PUT. The instruction(s) 202 also comprise other instruction(s) 208 that supplement applications on the system 200, for example, execution of functions of an operating system.

Data 210 serves, amongst other things, as a repository for storing data that may be fetched, processed, received, or generated during execution of the instruction(s) 202 by the processor 102. The data 210 comprises stream data 212 which stores data relating to validation instructions in an instruction stream and register data 214 which stores outcome(s) stored in the hardware registers accessible to the PUT. The data 210 also comprises other data 216 that may be fetched, processed, received, or generated during execution of other instruction(s) 208.

Consider that processor functionality of a PUT is to be validated. According to the present disclosure, an instruction stream is to be generated and executed in real-time, either simultaneously or sequentially, in the PUT and a reference processor. The PUT and the reference processor has identical capabilities, and identical number of accessible hardware registers. The stream generation instruction(s) 204 cause the generated instruction stream to be continuously forwarded to the PUT and the reference processor for being executed by the PUT and the reference processor, either simultaneously or sequentially. Although, in the following description, some actions, operations, computations, and tasks are described to be implemented by the PUT, the actions, operations, computations, and tasks implemented by the PUT may also be implemented by the reference processor. Thus, the following description is also applicable mutatis mutandis to the reference processor.

During operation, the stream generation instruction(s) 204 when executed by the processor 102 cause the processor 102 to insert a set of initialization instructions in the instruction stream, where the set of initialization instructions is configured to reset a plurality of hardware registers of the PUT. In an example, the set of initialization instructions may also reset the hardware registers of the reference processor. In an example, the set of initialization instructions may cause a predefined register value to be loaded in the hardware registers of the PUT and the reference processor. An example of the set of initialization instructions is provided below.

```
"mov loc5 = r32
;;
adds loc5 = 16, loc5
nop.i 0
;;
ld8 r2 = [loc5], 8
;;
ld8 r3 = [loc5], 8
nop.i 0
;;
......."
```

The set of initialization instructions, exemplified above, may be implemented to load the hardware registers of the PUT with predefined operand values on which the validation instructions may be executed. The set of initialization instructions, exemplified above, may be implemented in a processor having an "Itanium" based ISA, such as "IA-64".

In the example set of initialization instructions, consider that r32 is a hardware register which contains a starting memory address of a memory buffer where operand values for execution of the validation instruction(s) are sequentially stored. Execution of the instruction "mov loc5=r32" by the processor, causes the processor to copy the memory address contained in the hardware register r32 in a temporary variable, "loc5". Execution of the instruction "adds loc5=16, loc5" by the processor, causes the processor to increment the value of "loc5" so that "[loc5]" points to the memory address which contains the operand value to be stored in a hardware register r2.

The notation "[loc5]" refers to the memory address pointed by the variable "loc5". Thus, "[loc5]" functions similar to a memory pointer. Execution of the instruction "ld8 r2=[loc5], 8", by the processor, causes the processor to load the hardware register r2 with 8 bytes of operand value stored in the memory location pointed by "[loc5]" and updates the pointer "[loc5]" by 8 bytes, such that "[loc5]" now points to the next sequential memory address in the memory buffer where an operand value to be loaded in a subsequent hardware register, such as r3 is stored. Execution of the instruction "ld8 r3=[loc5], 8" by the processor, causes the processor to load the hardware register r3 with 8 bytes of operand value from the memory address pointed by the updated value of "[loc5]". "[loc5]" is further updated by 8 bytes, such that "[loc5]" points to the next sequential memory address in the memory buffer where an operand value to be loaded in a subsequent hardware register, such as r4, may be stored. Thus, the operand values may be loaded in each of the hardware registers r0 to r10 before a validation instruction is inserted in the instruction stream.

After the hardware registers of the PUT and the reference processor are reset or loaded with predefined values, the register monitoring instruction(s) 206 may cause the hardware registers to be marked as available for data storage. In an example, the register monitoring instruction(s) 206 may modify flag values corresponding to the hardware registers, where the flag value indicates whether the hardware register is available for data storage or not. In an example, the flag values may be stored in general purpose registers of the processor. In another example, the flag values may be stored in a memory buffer maintained by the processor.

The stream generation instruction(s) 204 then generates validation instructions based on an instruction set architecture of the PUT. The stream generation instruction(s) 204 further enable selection of a validation instruction, from the generated validation instructions. In an example, the stream generation instruction(s) 204 may cause the validation instruction to be selected based on a user input specifying a predefined operation of the PUT to be validated. In the example, the selected validation instruction may represent the predefined operation of the PUT which is to be validated.

After the validation instruction is selected, the stream generation instruction(s) 204 may enable determination of whether an outcome of execution of the validation instruction by the PUT is to update a register value of a hardware register accessible by the PUT. In an example, the stream generation instruction(s) 204, when executed by the processor 102 may cause the processor 102 to parse the validation instruction into its constituent opcode and operand. The stream generation instruction(s) 204 may cause the opcode and the operand to be analyzed to determine whether the outcome of execution of the validation instruction is to update the hardware register.

In response to determining that the outcome of execution of the validation instruction is to update the hardware register, the register monitoring instruction(s) 206 may cause identification of whether a hardware register, amongst a plurality of hardware registers of the PUT, is available for storing the outcome. In an example, the register monitoring instruction(s) 206 may monitor the flag values corresponding to each of the hardware registers, where the flag value indicates whether the register is available for data storage or not. By monitoring the flag values corresponding to the hardware registers, the register monitoring instruction(s) 206 may enable identification of whether the hardware register is available for storing the outcome. In response to identifying that the outcome of execution of the validation instruction does not update the hardware register, the stream generation instruction(s) 204 cause the validation instruction to be inserted in the instruction stream.

In response to identifying that the hardware register is available for storing the outcome, the register monitoring instruction(s) 206 may cause the hardware register to be fetched for storing the outcome. In an example, the hardware register may be fetched using a register address of the hardware register. The register monitoring instruction(s) 206, when executed by the processor 102, may cause the processor 102 to mark the fetched hardware register as temporarily unavailable for data storage. In an example, marking the fetched hardware register as temporarily unavailable includes changing the flag value corresponding to the fetched hardware register. After the fetched hardware register is marked as temporarily unavailable for data storage, the stream generation instruction(s) 204 cause the validation instruction to be inserted in the instruction stream.

In response to identifying that all of the hardware registers of the PUT are unavailable for storing the outcome, the stream generation instruction(s) 204 cause a set of data backup instructions to be inserted in the instruction stream. The set of data backup instructions refer to machine readable instructions which when executed by the PUT causes the PUT to store contents from the hardware registers of the PUT to a primary memory of the PUT. Thus, respective register values of each of the hardware registers of the PUT may be stored in the primary memory. In an example, the primary memory may be a cache memory, a RAM, or a ROM accessible by the PUT. Thus, when the hardware registers of the PUT are exhausted, before inserting a successive validation instruction in the instruction stream, the data backup instructions are inserted in the instruction stream. Transfer of respective register values of the hardware registers, from the hardware registers to the primary memory, may be referred to as a data back-up event.

After the data backup instructions are inserted in the instruction stream, the register monitoring instruction(s) 206 cause the hardware registers to be marked as available for data storage, prior to inserting the successive validation instruction in the instruction stream. In an example, the hardware registers may be marked as available for data storage by modifying the flag value corresponding to the hardware registers.

In an example, after inserting the validation instruction in the instruction stream, the stream generation instruction(s) 204 may identify a stream length of the instruction stream. In an example, the stream length may be represented as a number of bits of data. The identified stream length may be compared with a predefined stream length. In an example, the predefined stream length is specified by a user input.

In response to identifying that the stream length of the instruction stream is less than the predefined stream length, the stream generation instruction(s) 204 enables continued generation of the instruction stream. In response to identifying that the stream length of the instruction stream is equal to the predefined stream length, the stream generation instruction(s) 204 cause the set of data backup instructions to be inserted in the instruction stream. Further, the stream generation instruction(s) 204 cause a set of control instructions to be inserted in the instruction stream. The set of control instructions, when executed by the PUT or the reference processor, causes the PUT or the reference processor to restore their normal operation. Normal operation of the PUT/reference processor refers to actions, processes, tasks, and computations carried out by the PUT/reference processor when the processor functionality of the PUT is not under validation. In response to the normal operation being restored, the stream generation instruction(s) 204 cause generation of the instruction stream to be discontinued thereby indicating completion of generation of the instruction stream.

Since, the PUT and the reference processor has similar capabilities, identical number of hardware registers, respective hardware registers are initialized with identical register values being loaded in the respective hardware registers, and the same instruction stream is forwarded to both for execution, therefore, the register values captured through the data back-up events at the PUT and the reference processor are comparable.

After the generation and execution of the instruction stream is complete in the PUT and the reference processor, in an example, the register values stored in the primary memory of the PUT, after a first data back-up event, is compared with corresponding register values stored in the primary memory of the reference processor. Similarly, for each of the data back-up events, the register values stored in the primary memory of the PUT is compared with corresponding register values stored in the primary memory of the reference processor. With respect to a particular data back-up event, when a mismatch is detected between the register values stored in the primary memory of the PUT and the corresponding register values stored in the primary memory of the reference processor, it may be identified that execution of a validation instruction updating the hardware registers before the particular data back-up event resulted in a bug in the PUT. Once the validation instruction is identified, the opcode and operand of the validation instruction may be analyzed to identify the bug.

Figure 3:
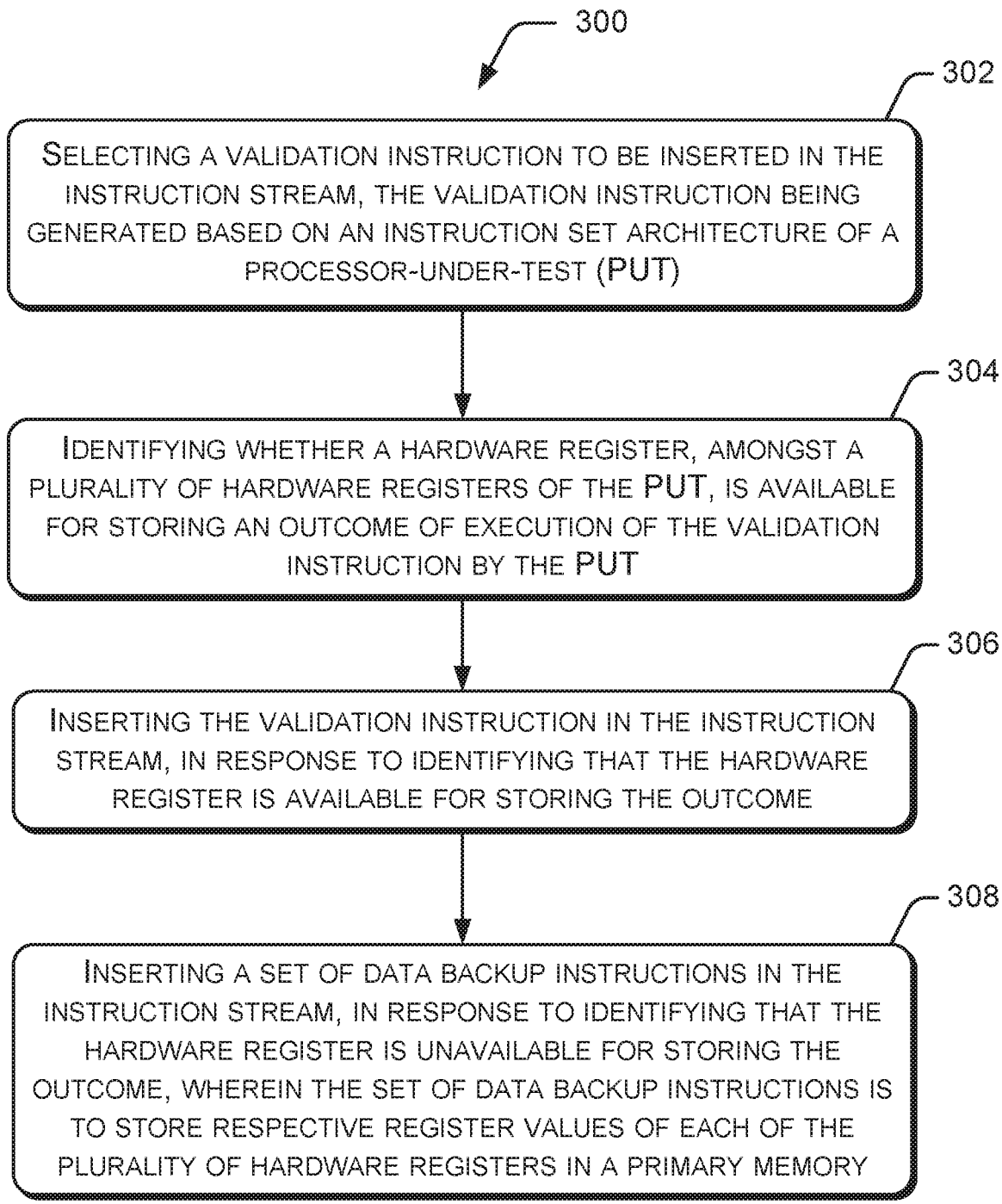
FIG. 3 illustrates a method for generation of an instruction stream for validating processor functionality, according to an example.

FIG. 3 illustrates a method 300 for generation of an instruction stream for validating processor functionality, according to an example. The method 300 may be executed by a system, such as the system 100 or 200. The method 300 can be implemented by processing resource(s) or computing device(s) through any suitable hardware, a non-transitory machine readable medium, or combination thereof. In an example, step(s) of the method 300 may be performed by execution of computer-readable instructions, such as the stream generation instruction(s) 204, register monitoring instruction(s) 206, which includes instructions stored on a medium and executable by a processing resource, such as the processor 102, of a system, such as the system 100 or 200. Further, although the method 300 is described in context of the aforementioned system 100 or 200, other suitable systems may be used for execution of the method 300. It may be understood that processes involved in the method 300 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 3, at block 302, a validation instruction to be inserted in an instruction stream is selected from a plurality of validation instructions. The instruction stream is generated and executed in real-time either simultaneously or sequentially by a processor-under-test (PUT) whose functional validation is being carried out and by a reference processor. The validation instructions are generated based on an instruction set architecture of the PUT. In an example, the validation instruction may be an instruction from an instruction set of the PUT which is checked for bugs. in an example, the validation instruction includes an opcode and an operand.

At block 304, it is identified whether a hardware register, amongst a plurality of hardware registers of the PUT, is available for storing an outcome of execution of the validation instruction by the PUT. The outcome refers to the output or result after execution of the validation instruction.

At block 306, the validation instruction is inserted in the instruction stream, in response to identifying that the hardware register is available for storing the outcome.

At block 308, a set of data backup instructions are inserted in the instruction stream, in response to identifying that the hardware register is unavailable for storing the outcome. The set of data backup instructions is to store respective register values of each of the plurality of hardware registers in a primary memory. In an example, the set of data backup instructions when executed by the PUT causes the PUT to store register values of the hardware registers of the PUT in a primary memory associated with the PUT. Examples of the primary memory include cache memory, RAM, and ROM.

Figure 4A:
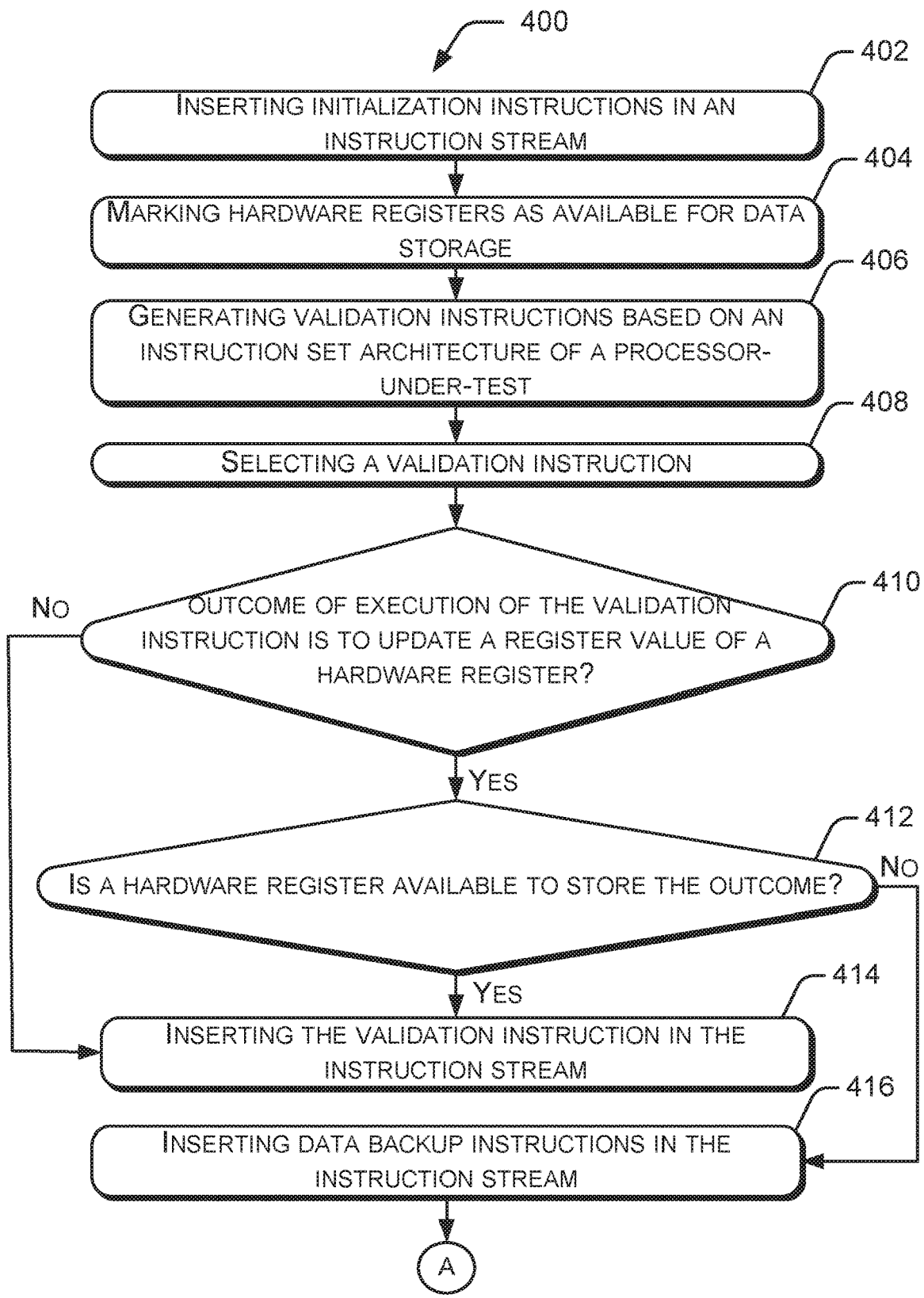
FIGS. 4A and 4B illustrate a method for generation of an instruction stream for validating processor functionality, according to another example.
Figure 4B:
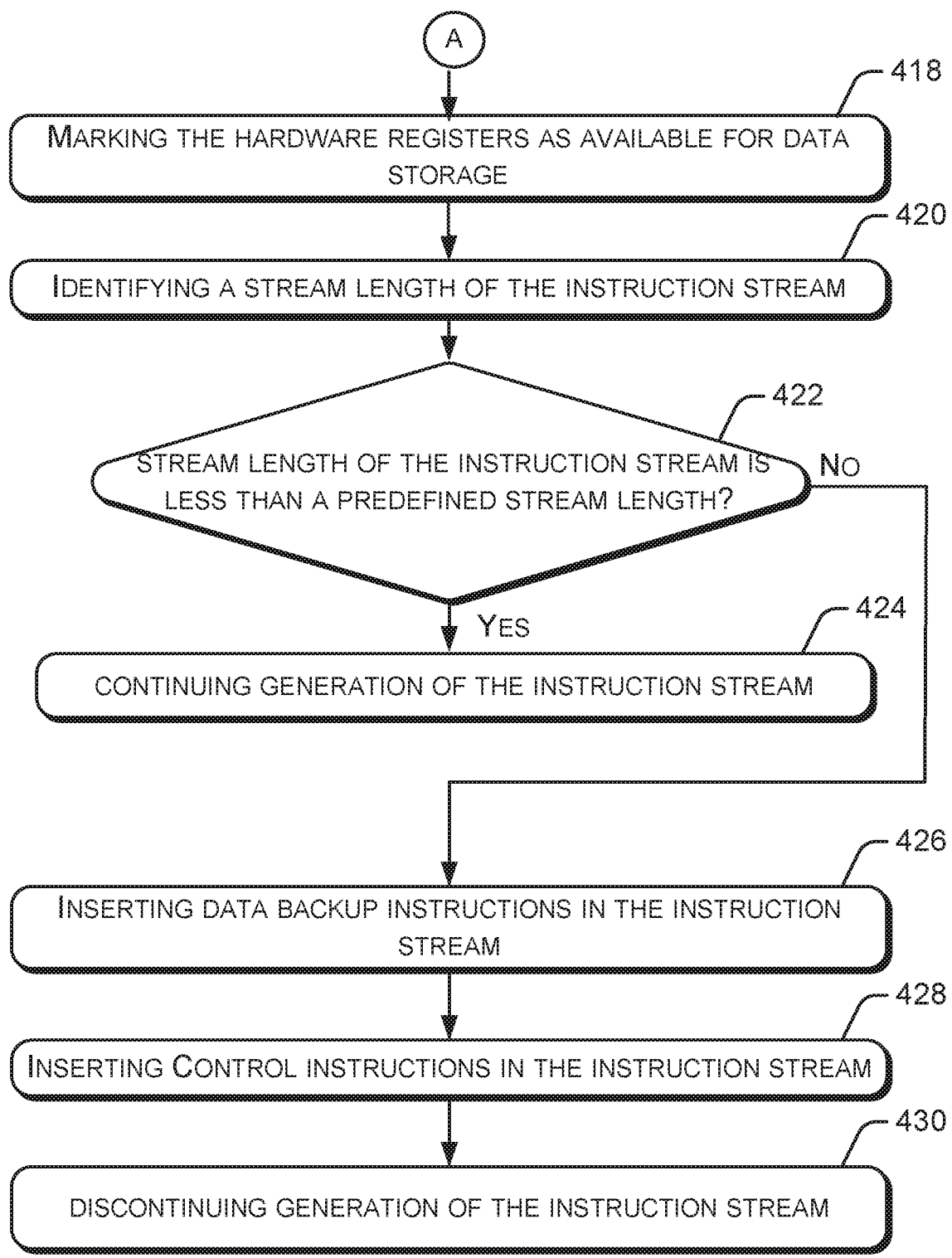

FIGS. 4A and 4B illustrate a method 400 for generation of an instruction stream for validating processor functionality, according to an example. The method 400 may be executed by a system, such as the system 100 or 200. The method 400 can be implemented by processing resource(s) or computing device(s) through any suitable hardware, a non-transitory machine readable medium, or combination thereof. In an example, the method 400 may be performed by computer-readable instructions, such as the stream generation instruction(s) 204 and the register monitoring instruction(s) 206 which include instructions stored on a medium and executable by a processing resource, such as the processor 102, of a system, such as the system 100 or 200. Further, although the method 400 is described in context of the aforementioned system 100 or 200, other suitable systems may be used for execution of the method 400. It may be understood that processes involved in the method 400 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Figure 5:
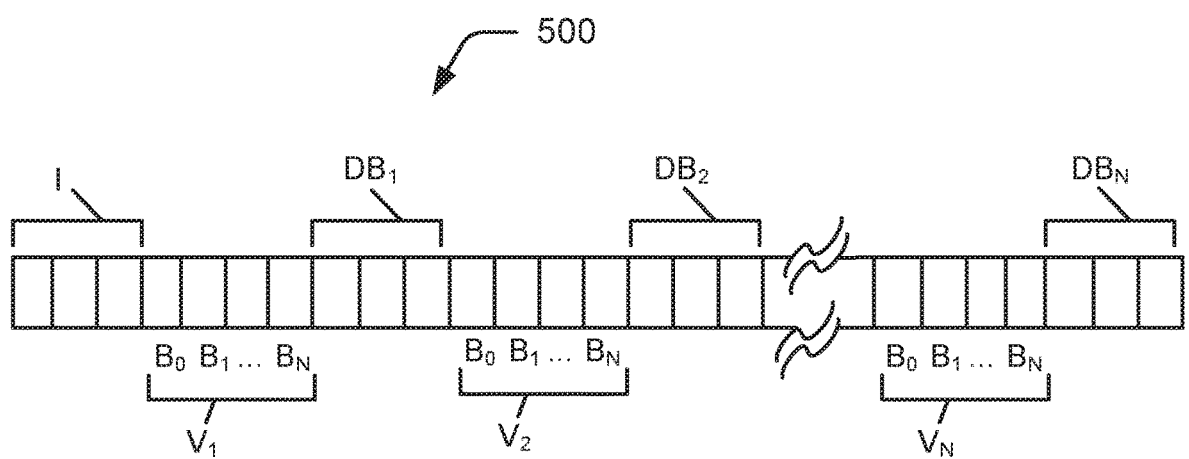
FIG. 5 illustrates an instruction stream generated for validating processor functionality, according to an example.

Referring to FIG. 4A, at block 402, a set of initialization instructions are inserted in an instruction stream which is to be generated and executed in real-time by a processor-under-test (PUT) and a reference processor, either simultaneously or sequentially. The initialization instructions cause the processor to reset the plurality of hardware registers of the PUT and the reference processor and load respective hardware registers of the PUT and the reference processor with identical values. FIG. 5 illustrates an instruction stream 500 generated for validating processor functionality, according to an example. At the beginning of instruction stream 500, the set of initialization instructions, indicated as initialization instructions I in FIG. 5, may be inserted in the instructions stream 500.

As per the present disclosure, an instruction stream is generated and executed in real-time, either simultaneously or sequentially, in the PUT and the reference processor. Although, the following description refers to the PUT, the actions, operations, tasks, and computations concerning the PUT may also be implemented at the reference processor. Thus, the following description is applicable mutatis mutandis to the reference processor.

At block 404, the plurality of hardware registers of the PUT is marked as available for data storage. At block 406, a plurality of validation instructions is generated based on an instruction set architecture of the PUT. The validation instruction may be executed for validating processor functionality of the PUT. At block 408, a validation instruction is selected from the plurality of validation instructions for being inserted in the instruction stream.

In an example, a plurality of validation instructions, $V_1$, $V_2$, $V_3$, ..., $V_N$, also referred to as validation instructions V, may be generated. Each validation instruction is a collection of instructions and may also be referred to as a validation instruction sub-stream. Bytes $B_0$ to $B_N$ represent the length of each of the validation instruction sub streams. A validation instruction sub stream $V_1$ may be selected from the validation instructions V.

At block 410, it is determined whether an outcome of execution of the selected validation instruction by the PUT is to update a register value of a hardware register, amongst the plurality of hardware registers, associated with the PUT. With reference to FIG. 5, it may be checked whether the outcome of execution of the validation instruction sub stream $V_1$, is to update a register value of the hardware register. At block 412, in response to identifying that the outcome is to update the register value of the hardware register ("Yes" branch from block 410), it is identified whether the hardware register, is available for storing the outcome.

In response to identifying that the hardware register is available for storing the outcome ("Yes" branch from block 412) or that the outcome does not update the register value ("No" branch from block 410), the selected validation instruction is inserted in the instruction stream, at block 414. With reference to FIG. 5, the selected validation instruction sub stream $V_1$ may be inserted in the instruction stream 500 after the initialization instructions I. In an example, prior to inserting the validation instruction in the instruction stream, the available hardware register is fetched and marked as temporarily unavailable for data storage.

In response to identifying that the hardware register is unavailable for storing the outcome ("No" branch from block 412), a set of data backup instructions is inserted in the instruction stream, at block 416. The set of data backup instructions when executed by the processor causes the processor to store respective register values of each of the plurality of hardware registers in a primary memory of the PUT. As shown in FIG. 5, the set of data backup instructions $DB_1$ may be inserted in the instruction stream 500 after the validation instruction sub stream $V_1$.

Referring to FIG. 4B, at block 418, after inserting the data backup instructions in the instruction stream, the plurality of hardware registers is marked as available for data storage, prior to inserting a successive validation instruction in the instruction stream. The successive validation instruction may refer to validation instruction sub stream $V_2$. At block 420, a stream length of the instruction stream is identified, after inserting the validation instruction in the instruction stream. Thus, after the validation instruction sub stream $V_1$ and the data backup instructions $DB_1$ are inserted in the instruction stream 500, a stream length of the instruction stream may be computed.

At block 422, it is checked whether the stream length of the instruction stream is less than a predefined stream length, where the predefined stream length is based on user inputs. In response to identifying that the stream length of the instruction stream is less than the predefined stream length ("Yes" branch from block 422), generation of the instruction stream is continued, at block 424. On continuation of the generation of the instruction stream, the validation instruction sub stream $V_2$ may be inserted in the instruction stream 500 after the data backup instructions $DB_1$. The validation instructions $V_3, \ldots, V_N$ may be inserted one after another as long as the stream length does not reach the predefined stream length. After the validation instructions $V_2$ is inserted in the instruction stream 500, a set of data backup instructions $DB_2$ may be inserted in the instructions stream 500, in response to identifying that a hardware register is unavailable for storing the outcome of execution of the validation instruction sub stream $V_2$.

At block 422, in response to identifying that the stream length of the instruction stream is not less than the predefined stream length ("No" branch from block 422), the set of data backup instructions are inserted in the instruction stream, at block 426. Once the stream length reaches the predefined stream length, data backup instructions $DB_N$ may be inserted at the end of the instruction stream 500 after validation instruction sub stream $V_N$, as shown in FIG. 5. Thus, validation instructions $V_1, V_2, \ldots, V_N$ may be inserted in the instruction stream 500 for execution by the PUT. The set of data backup instructions, $DB_1, DB_2, \ldots, DB_N$ may cause the PUT to capture the current machine states of the processor by storing respective register values of each of the plurality of hardware registers after execution of each of the validation instruction sub streams $V_1, V_2, \ldots, V_N$, respectively. Thus, all the register values are captured through execution of the data backup instructions at the PUT and the reference processor. At block 428, a set of control instructions is inserted in the instruction stream, where the set of control instructions is to restore normal operation of the PUT. At block 430, generation of the instruction stream is discontinued.

Figure 6:
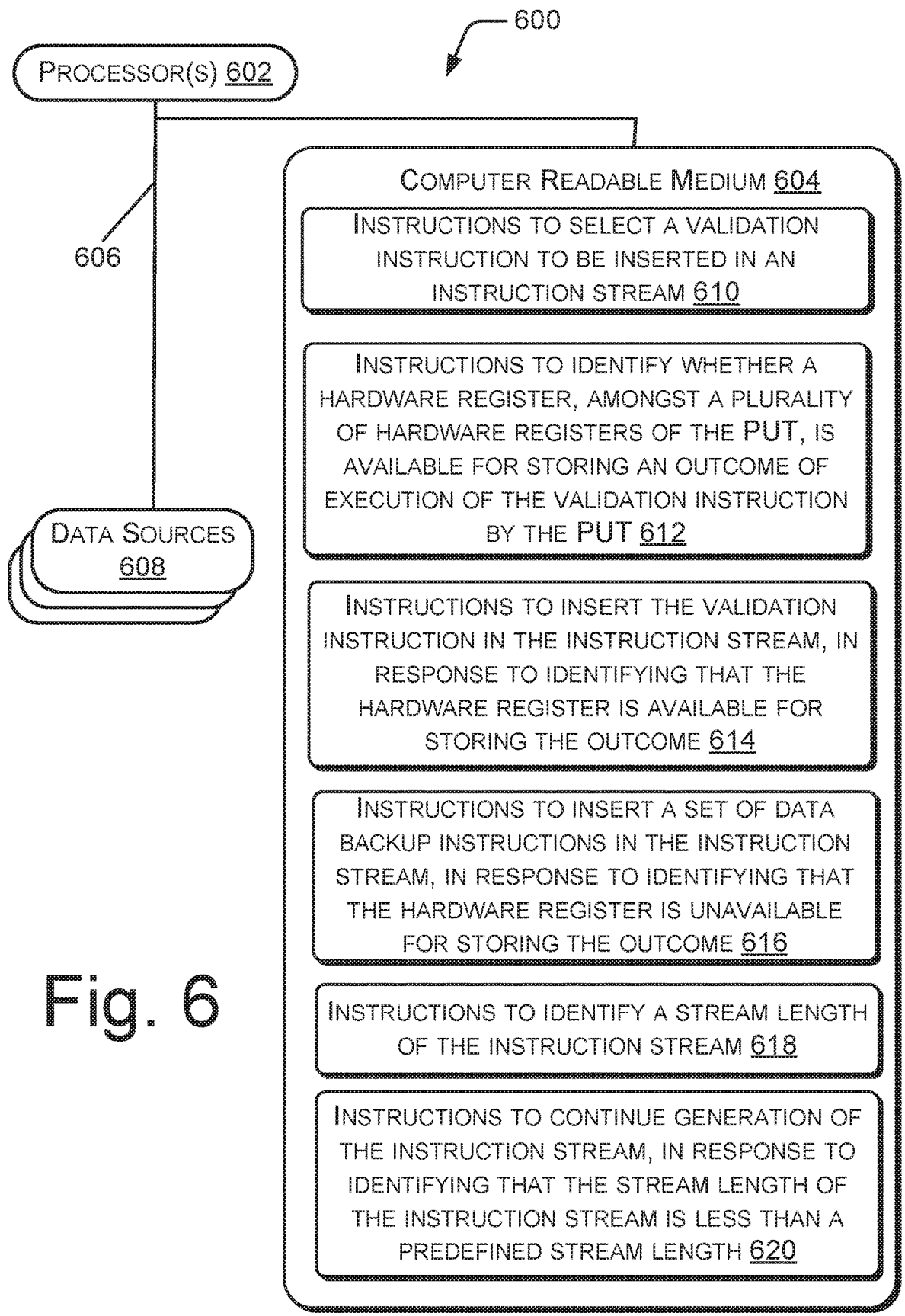
FIG. 6 illustrates a system environment implementing a non-transitory computer-readable medium for generation of an instruction stream for validating processor functionality, according to an example.

FIG. 6 illustrates a system environment 600 implementing a non-transitory computer-readable medium for generation of an instruction stream for validating processor functionality, according to an example. In an example, the system environment 600 includes processor(s) 602 communicatively coupled to a non-transitory computer-readable medium 604 through a communication link 606. In an example, the system environment 600 may be a system, such as the system 100 or 200. In an example, the processor(s) 602 may have one or more processing resources for fetching and executing computer-readable instructions from the non-transitory computer-readable medium 604.

The non-transitory computer-readable medium 604 can be, for example, an internal memory device or an external memory device. In an example implementation, the communication link 606 may be a direct communication link, such as any memory read/write interface.

The processor(s) 602 and the non-transitory computer-readable medium 604 may also be communicatively coupled to data sources 608 over a network, such as the Internet. The data sources 608 can include, for example, memory of the system, such as the system 100 or 200.

In an example implementation, the non-transitory computer-readable medium 604 includes a set of computer-readable instructions which can be accessed by the processor(s) 602 through the communication link 606 and subsequently executed to perform acts for generation of an instruction stream for validating processor functionality.

Referring to FIG. 6, in an example, the non-transitory computer-readable medium 604 includes instructions 610 that cause the processor(s) 602 to select a validation instruction to be inserted in an instruction stream, the validation instruction being generated based on an instruction set architecture of a processor-under-test (PUT) whose functionality is being validated.

Further, the non-transitory computer-readable medium 604 includes instructions 612 that cause the processor(s) 602 to identify whether a hardware register, amongst a plurality of hardware registers of the PUT, is available for storing an outcome of execution of the validation instruction by the PUT. In an example, the non-transitory computer-readable medium 604 includes instructions that cause the processor(s) 602 to determine whether the outcome of the validation instruction is to update a register value of the hardware register, prior to identifying whether the hardware register is available for storing the outcome.

The non-transitory computer-readable medium 604 includes instructions 614 that cause the processor(s) 602 to insert the validation instruction in the instruction stream, in response to identifying that the hardware register is available for storing the outcome.

Further, the non-transitory computer-readable medium 604 includes instructions 616 that cause the processor(s) 602 to insert a set of data backup instructions in the instruction stream, in response to identifying that the hardware register is unavailable for storing the outcome. The set of data backup instructions is to store respective register values of each of the plurality of hardware registers in a primary memory, such as a primary memory associated with the PUT. In an example, the non-transitory computer-readable medium 604 includes instructions that cause the processor(s) 602 to mark the plurality of hardware registers as available for data storage, after inserting the data backup instructions in the instruction stream and prior to inserting a successive validation instruction in the instruction stream.

Further, the non-transitory computer-readable medium 604 includes instructions 618 that cause the processor(s) 602 to identify a stream length of the instruction stream, after the validation instruction is inserted in the instruction stream.

The non-transitory computer-readable medium 604 includes instructions 620 that cause the processor(s) 602 to continue generation of the instruction stream, in response to identifying that the stream length of the instruction stream is less than a predefined stream length. the predefined stream length based on user inputs.

In an example, the non-transitory computer-readable medium 604 includes instructions that cause the processor(s) 602 to insert the set of data backup instructions in the instruction stream, in response to identifying that the stream length of the instruction stream is equal to the predefined stream length. Further, the non-transitory computer-readable medium 604 includes instructions that cause the processor(s) 602 to insert a set of control instructions in the instruction stream. The set of control instructions is to restore normal operation of the PUT. Further, the non-transitory computer-readable medium 604 includes instructions that cause the processor(s) 602 to discontinue generation of the instruction stream thereby indicating completion of the validation process.

Although implementations of present subject matter have been described in language specific to structural features and/or methods, it is to be noted that the present subject matter is not necessarily limited to the specific features or methods described. Rather, the specific features and methods are disclosed and explained in the context of a few implementations for the present subject matter.

We claim:

1. A method for generation of an instruction stream for validating processor functionality, the method comprising:
    selecting a validation instruction to be inserted in the instruction stream, the validation instruction being generated based on an instruction set architecture of a processor-under-test (PUT);
    identifying whether a hardware register, amongst a plurality of hardware registers of the PUT, is available for storing an outcome of execution of the validation instruction by the PUT;
    inserting the validation instruction in the instruction stream, in response to identifying that the hardware register is available for storing the outcome; and
    inserting a set of data backup instructions in the instruction stream, in response to identifying that the hardware register is unavailable for storing the outcome, wherein the set of data backup instructions is to store respective register values of each of the plurality of hardware registers in a primary memory.

2. The method as claimed in claim 1, further comprising:
    after inserting the set of data backup instructions in the instruction stream, marking the plurality of hardware registers as available for data storage, prior to inserting a successive validation instruction in the instruction stream.

3. The method as claimed in claim 1, further comprising:
    determining whether the outcome is to update a register value of at least one hardware register, amongst the plurality of hardware registers, prior to identifying whether the hardware register is available for storing the outcome.

4. The method as claimed in claim 1, further comprising:
    identifying a stream length of the instruction stream, after inserting the validation instruction in the instruction stream; and
    continuing generation of the instruction stream, in response to identifying that the stream length of the instruction stream is less than a predefined stream length.

5. The method as claimed in claim 4, further comprising:
    inserting the set of data backup instructions in the instruction stream, in response to identifying that the stream length of the instruction stream is equal to the predefined stream length;
    inserting a set of control instructions in the instruction stream, wherein the set of control instructions is to restore normal operation of the PUT; and
    discontinuing generation of the instruction stream.

6. The method as claimed in claim 1, wherein, prior to selecting the validation instruction, the method further comprising:
    inserting a set of initialization instructions in the instruction stream, wherein the set of initialization instructions is to reset the plurality of hardware registers; and
    marking the plurality of hardware registers as available for data storage.

7. The method as claimed in claim 1, wherein, in response to identifying that the hardware register is available for storing the outcome, the method further comprises:
    fetching the hardware register, prior to inserting the validation instruction in the instruction stream; and
    marking the hardware register as temporarily unavailable for data storage.

8. The method as claimed in claim 1, further comprising:
    continuously forwarding the generated instruction stream to the PUT for being executed by the PUT.

9. The method as claimed in claim 1, wherein the validation instruction includes an opcode and an operand.

10. A system comprising:
    a processor; and
    a memory coupled to the processor, the memory storing instructions executable by the processor to:
        generate a plurality of validation instructions based on an instruction set architecture of a processor-under-test (PUT);
        select a validation instruction, amongst the plurality of validation instructions, to be inserted in an instruction stream to be executed by the PUT;
        determine whether an outcome of execution of the validation instruction by the PUT is to update a register value of a hardware register, amongst a plurality of hardware registers of the PUT;
        identify whether the hardware register is available for storing the outcome;
        insert the validation instruction in the instruction stream, in response to identifying that the hardware register is available for storing the outcome; and
        insert a set of data backup instructions in the instruction stream, in response to identifying that the hardware register is unavailable for storing the outcome, wherein the set of data backup instructions is to store respective register values of each of the plurality of hardware registers in a primary memory.

11. The system as claimed in claim 10, wherein the processor is further to:
    mark the plurality of hardware registers as available for data storage, after inserting the set of data backup instructions in the instruction stream, and prior to inserting a successive validation instruction in the instruction stream.

12. The system as claimed in claim 10, wherein the processor is further to:
    identify a stream length of the instruction stream, after the validation instruction is inserted in the instruction stream; and continue generation of the instruction stream, in response to identifying that the stream length of the instruction stream is less than a predefined stream length.

13. The system as claimed in claim 12, wherein the processor is further to:
insert the set of data backup instructions in the instruction stream, in response to identifying that the stream length of the instruction stream is equal to the predefined stream length;
insert a set of control instructions in the instruction stream, wherein the set of control instructions is to restore normal operation of the PUT; and
discontinue generation of the instruction stream.

14. The system as claimed in claim 10, wherein, the processor is further to:
insert a set of initialization instructions in the instruction stream prior to the validation instruction being inserted in the instruction stream, wherein the set of initialization instructions is to reset the plurality of hardware registers; and
mark the plurality of hardware registers as available for data storage.

15. The system as claimed in claim 10, wherein, in response to identifying that the hardware register is available for storing the outcome, the processor is further to:
fetch the hardware register, prior to inserting the validation instruction in the instruction stream; and
mark the hardware register as temporarily unavailable for data storage.

16. The system as claimed in claim 10, wherein the processor is further to:
continuously forward the generated instruction stream to the PUT for being executed by the PUT.

17. A non-transitory computer-readable medium comprising computer-readable instructions, the computer-readable instructions when executed by a processor, cause the processor to:
generate an instruction stream for validating functionality of a processor-under-test (PUT), wherein the computer-readable instructions to generate the instruction stream when executed by the processor, cause the processor to:
select a validation instruction to be inserted in the instruction stream, the validation instruction being generated based on an instruction set architecture of the PUT;
identify whether a hardware register, amongst a plurality of hardware registers of the PUT, is available for storing an outcome of execution of the validation instruction by the PUT;
insert the validation instruction in the instruction stream, in response to identifying that the hardware register is available for storing the outcome;
insert a set of data backup instructions in the instruction stream, wherein the set of data backup instructions is to store respective register values of each of the plurality of hardware registers in a primary memory, in response to identifying that the hardware register is unavailable for storing the outcome;
identify a stream length of the instruction stream, after the validation instruction is inserted in the instruction stream; and
continue generation of the instruction stream, in response to identifying that the stream length of the instruction stream is less than a predefined stream length.

18. The non-transitory computer-readable medium as claimed in claim 17, wherein the computer-readable instructions, when executed by the processor, further cause the processor to:
mark the plurality of hardware registers as available for data storage, after inserting the set of data backup instructions in the instruction stream and prior to inserting a successive validation instruction in the instruction stream.

19. The non-transitory computer-readable medium as claimed in claim 17, wherein the computer-readable instructions, when executed by the processor, further cause the processor to:
determine whether the outcome of the validation instruction is to update a register value of at least one hardware register, amongst the plurality of hardware registers, prior to identifying whether the hardware register is available for storing the outcome.

20. The non-transitory computer-readable medium as claimed in claim 17, wherein the computer-readable instructions, when executed by the processor, further cause the processor to:
insert the set of data backup instructions in the instruction stream, in response to identifying that the stream length of the instruction stream is equal to the predefined stream length;
insert a set of control instructions in the instruction stream, wherein the set of control instructions is to restore normal operation of the PUT; and
discontinue generation of the instruction stream.

* * * * *